(12) United States Patent
Gonnert et al.

(10) Patent No.: US 9,284,100 B2
(45) Date of Patent: Mar. 15, 2016

(54) HINGED CLOSURE LID

(75) Inventors: Peter Gonnert, Ostheim (DE); Kerstin Krallmann, Salzuflen (DE); Rainer Krallmann, Hiddenhausen (DE)

(73) Assignee: KRALLMANN KUNSTSOFFVERARBEITUNG GMBH, Hiddenhausen (DE)

( * ) Notice: Subject to any disclaimer, the term of this patent is extended or adjusted under 35 U.S.C. 154(b) by 0 days.

(21) Appl. No.: 14/343,525

(22) PCT Filed: Aug. 17, 2012

(86) PCT No.: PCT/EP2012/003508
§ 371 (c)(1),
(2), (4) Date: Mar. 7, 2014

(87) PCT Pub. No.: WO2013/034245
PCT Pub. Date: Mar. 14, 2013

(65) Prior Publication Data
US 2014/0224802 A1 Aug. 14, 2014

(30) Foreign Application Priority Data
Sep. 8, 2011 (DE) .......... 10 2011 112 616

(51) Int. Cl.
*B65D 43/26* (2006.01)
*B65D 47/08* (2006.01)
(Continued)

(52) U.S. Cl.
CPC ............ *B65D 43/26* (2013.01); *B29C 45/0017* (2013.01); *B29C 45/0081* (2013.01);
(Continued)

(58) Field of Classification Search
CPC .. B65D 47/103; B65D 47/10; B65D 47/0871; B65D 47/0866; B65D 47/0861; B65D 47/0857; B65D 47/08; B65D 47/06; B65D 43/168; B65D 43/169; B65D 43/163; B65D 43/16; B65D 43/26; B65D 47/0814; B65D 47/0809; B65D 47/0804; B29C 45/0017; B29C 45/0081
USPC ........... 220/836, 829, 827, 810, 254.6, 254.5, 220/254.3, 254.1, 258.3, 258.1, 259.2, 220/256.1, 212, 284; 215/244, 245, 238, 215/237, 235, 228, 253, 250; 222/541.6, 222/541.1, 568, 567
See application file for complete search history.

(56) References Cited

U.S. PATENT DOCUMENTS

| 4,795,044 A | 1/1989 | Beck |
| 4,941,592 A | 7/1990 | Kitterman |

(Continued)

FOREIGN PATENT DOCUMENTS

| EP | 1174359 A2 * | 1/2002 | ............. B65D 47/08 |
| EP | 2 035 292 B1 | 5/2010 | |

(Continued)

OTHER PUBLICATIONS

Translation of EP 1174359 (Suffa), Jan. 23, 2002, Paragraphs 5 and 32.*

(Continued)

*Primary Examiner* — Robert J Hicks
(74) *Attorney, Agent, or Firm* — McGlew and Tuttle, P.C.

(57) ABSTRACT

A hinged closure lid made of plastic for placing onto a container, has a main part which has a dispenser opening, a lid which is mounted pivotably on the main part and, in a closure position resting on the main part, closes the dispenser opening, and an actuating part which is mounted on the main part so as to be adjustable between an inoperative position and an actuating position. The lid can be adjusted from the closure position in the direction of an open position when the actuating part is actuated. The actuating part here is connected to the lid via at least one flexible web serving as a predetermined breaking point. The web is destroyed when the actuating part is first adjusted into the actuating position.

19 Claims, 6 Drawing Sheets

(51) Int. Cl.
*B29C 45/00* (2006.01)
*B29L 31/56* (2006.01)

(52) U.S. Cl.
CPC ......... *B65D47/0814* (2013.01); *B29C 45/006* (2013.01); *B29L 2031/565* (2013.01); *B65D 2101/003* (2013.01); *B65D 2251/1016* (2013.01); *B65D 2251/1025* (2013.01); *B65D 2251/1058* (2013.01); *B65D 2251/1066* (2013.01)

(56) References Cited

U.S. PATENT DOCUMENTS

| | | |
|---|---|---|
| 5,201,440 A | 4/1993 | Gross |
| 5,875,907 A | 3/1999 | Lay |
| 6,269,986 B1 | 8/2001 | Gross |
| 6,405,885 B1 | 6/2002 | Elliott |
| 2006/0011573 A1 | 1/2006 | Herald et al. |
| 2007/0095864 A1* | 5/2007 | Vangeel et al. ............... 222/556 |
| 2007/0205177 A1 | 9/2007 | Delage |
| 2008/0245795 A1 | 10/2008 | Berge |

FOREIGN PATENT DOCUMENTS

| | | | |
|---|---|---|---|
| JP | H07291327 A | 11/1995 | |
| JP | 2006103778 A * | 4/2006 | ............. B65D 47/08 |

OTHER PUBLICATIONS

Translation of JP 2006103778 (Miyanishi et al.), Apr. 20, 2006, Paragraphs 9, 15, and 17.*

* cited by examiner

HINGED CLOSURE LID

CROSS REFERENCE TO RELATED APPLICATIONS

This application is a United States National Phase Application of International Application PCT/EP2012/003508 filed Aug. 17, 2012 and claims the benefit of priority under 35 U.S.C. §119 of German patent application DE 10 2011 112 616.7 filed Sep. 8, 2011, the entire contents of which are incorporated herein by reference.

FIELD OF THE INVENTION

The invention relates to a hinged closure lid made of plastic for placing onto a container, with a main part which has a dispenser opening, a lid which is mounted pivotably on the main part and, in a closure position resting on the main part, closes the dispenser opening, and an actuating part which is mounted on the main part so as to be adjustable between an inoperative position and an actuating position, wherein the lid is adjustable from the closure position in the direction of an open position when the actuating part is actuated.

The invention furthermore relates to a method for producing and installing a corresponding hinged closure lid.

BACKGROUND OF THE INVENTION

A hinged closure lid of the type mentioned customarily serves to open a bottle, a tube or another container in which, for example, a cream, liquid soap, toothpaste or another flowable or pourable product can be contained, in a simple manner when required by the user using a finger of the hand which grasps the container to adjust the actuating part and thereby open the lid. "Single-handed operation" is therefore possible in order to open the lid and gain access to the product in the container. A corresponding hinged closure lid is depicted in EP 2 035 292 B1.

A hinged closure lid of this type has a substantially cylindrical main part to which a lid is connected in an articulated manner. An actuating part is mounted pivotably inside the main part, and, in a closed state of the hinged closure lid, the user can exert a compressive force on said actuating part, as a result of which the actuating part pivots about an axis of rotation and, in the process, pushes the lid upwards into the open position thereof.

The main part, the lid and the actuating part are designed as a single-piece injection-molded plastics part, wherein the lid is connected to the main part via strap hinges.

The actuating part is integrally connected to the main part via two torsion pins arranged on different sides. The torsion pins defined the pivot axis of the actuating part, wherein a restoring force for the actuating part can be derived from the internal stresses of the torsion pins.

In the known hinged closure lid, the actuating part is arranged on the upper side of the main part in the vicinity of the dispenser opening. This is associated with the disadvantage that the product may enter during use into the intermediate space between the main part and the actuating part. In the case of certain products, this is not acceptable for hygienic reasons, and there is the risk of the adjustability of the actuating part relative to the main part being obstructed by adhering product residues.

Furthermore, the known hinged closure lid is very complicated to produce, since a complicated tool is required for forming the torsion pins.

For many products, it is desirable for the user to identify that the hinged closure lid has previously not been opened. A "tamper-evident indicator" of this type has to be attached retrospectively in the case of the known hinged closure lid by, for example, the hinged closure lid being covered with a film. This procedure is complicated and costly.

SUMMARY OF THE INVENTION

The invention is based on the object of providing a hinged closure lid of the type mentioned, which can be produced in a simple manner and has an integrated tamper-evident indicator.

Furthermore, the intention is to provide a method for producing and installing a corresponding hinged closure lid, which method can be carried out rapidly and cost-effectively.

With regard to the hinged closure lid, this object is achieved by a hinged closure lid made of plastic for placing onto a container, with a main part which has a dispenser opening, a lid which is mounted pivotably on the main part and, in a closure position resting on the main part, closes the dispenser opening, and an actuating part which is mounted on the main part so as to be adjustable between an inoperative position and an actuating position. The lid is adjustable from the closure position in the direction of an open position when the actuating part is actuated. The actuating part is connected to the lid via at least one flexible web serving as a predetermined breaking point. The web is destructible when the actuating part is first adjusted into the actuating position.

Provision is made here for the actuating part to be connected to the lid via at least one flexible web serving as a predetermined breaking point, wherein the web is destructible when the actuating part is first adjusted into the actuating position.

Also in the case of the hinged closure lid, the lid part and the actuating part are formed, preferably also together with the main part, as a single-piece injection-molded plastics part. In this case, the actuating part is connected to the lid preferably exclusively via the flexible web. As soon as a user brings the actuating part into the actuating position thereof in order to open the lid, the web is destroyed. The web thereby serves as a tamper-evident indicator which can be perceived by the user in a simple manner.

In a preferred refinement of the invention, provision is made for the actuating part to be connected to the lid solely via the web. After destruction of the web, the actuating part is released from the lid but is held adjustably on the main part and is therefore mounted in a floating manner.

The web preferably forms a hinge joint by said web being, for example, of strap-like design. It is thereby possible to pivot the actuating part about the web for the installation (illustrated later in detail) of the hinged closure lid and to bring said actuating part into the installation position. The connection between the lid and the actuating part via the web ensures that said two parts take up a desired relative position before installation.

In a preferred refinement of the invention, provision is made for the web in the region of the edge to be arranged on the outside of the lid. It is thereby ensured that the web can be perceived in a simple manner by the user.

The web is preferably arranged adjacent to a finger rest of the actuating part. The user rests a finger on the finger rest in order to exert an adjustment force on the actuating part. If the web is arranged directly adjacent to the finger support, it is thereby ensured that the force applied by the user is conducted over a short path to the web and leads there to a destruction of the web. Furthermore, the user customarily sees the finger rest during the opening of the hinged closure lid and can therefore immediately identify whether the web has already been destroyed or is still undamaged.

After the web has been destroyed when the actuating part is first adjusted, the actuating part is released from the lid and is freely adjustable relative thereto. In order to obtain a defined adjustment movement, provision is made, in a development of the invention, for the actuating part to be mounted displaceably on the main part. This can be achieved, for example, by the actuating part being held in a form-fitting on the main part in particular by latching. The actuating part can therefore be adjusted in a defined manner between the inoperative position thereof and the actuating position thereof, wherein said actuating part is held and guided on the main part.

In a first refinement, provision can be made for the actuating part to be arranged within the main part, which is designed as a housing, and to be mounted displaceably therein. Alternatively, it is also possible, however, to design the actuating part in the manner of a housing and to arrange the main part within the actuating part. In this configuration, the actuating part therefore surrounds the main part and is likewise mounted displaceably thereon.

The lid is preferably also integrally connected to the main part, and therefore the main part, the lid and the actuating part can be produced as a single-piece injection-molded plastics part. In this case, provision is made in particular for the lid to be connected in a manner known per se to the main part via at least one strap hinge which forms a hinge joint.

Additionally or alternatively thereto, provision can be made for the lid to be connected to the main part via at least one spring shackle.

The spring shackle or the spring shackles can be dimensioned and positioned in such a manner that they apply a force to the lid prestressing said lid into the open position thereof. This has the result that the lid automatically pivots into the open position thereof as soon as the lid is released from the main part by actuating of the actuating part.

The spring shackle is preferably dimensioned and oriented in such a manner that said spring shackle, in the manner of a spring-loaded toggle lever, exerts a spring force in a different direction depending on the state of deformation. If the lid is displaced out of the closure position thereof in the direction of the open position, the spring force of the spring shackle, which spring force loads the cover into the closure position, first of all has to overcome. If a certain deformation of the spring shackle is achieved at a "switching-over point", the spring force of the spring shackle acts in the opposite direction, i.e. into the open position of the lid. The spring shackle thereby supports both the opening movement of the lid, by said spring shackle reliably bringing the lid into the open position thereof after the switching-over point has been reached, and also the closing movement of the lid, by the spring shackle loading the lid into the closure position after the switching-over point is reached.

The lid can be kept in the closure position thereof on the main part either in a frictional manner by means of friction of clamping or in a form-fitting manner. Provision can be made here for the lid, in the closure position thereof, to be in engagement in a form-fitting manner with the actuating part. For this purpose, the lid can have a first engagement part which, in the closure position of the lid, can be brought into engagement with a second engagement part of the actuating part. For example, the lid can have at least one extension which reaches through the main part by way of an aperture in the closure position of the lid. If the user actuates the actuating part, the two engagement parts can be disengaged, and therefore the lid comes free from the form-fitting mounting thereof on the actuating part and can be adjusted into the open position.

In a possible refinement, the main part has a cylindrical basic shape and, in particular, a circular-cylindrical basic shape. Provision can be made for the main part and the actuating part to be connected at diametrically opposite sections of the lid to the latter.

In a preferred refinement of the invention, provision can be made for the main part to be of hood-shape design and to have an upper side and an encircling circumferential surface. The circumferential surface can be provided with a cut-out at which the actuating part, which is very substantially arranged inside the main part in the fitted state, reaches with the finger rest thereof through the wall of the main part.

Alternatively, provision can be made for the actuating part to be of housing-shaped design, and for the main part to be arranged in the actuating part. Also in this case, the lid and the actuating part can be connected at diametrically opposite sections of the main part to the latter. In this refinement, an encircling circumferential surface of the actuating part is provided with a cut-out at which the main part, which is very substantially arranged inside the actuating part in the fitted state, reaches through the wall of the actuating part with a section.

The actuating part is mounted adjustably and preferably displaceably on the main part. If the actuating part is adjusted into the actuating position by the user, said actuating part acts on the lid and releases the latter from engagement with the actuating part and/or the main part, after which the lid pivots, preferably automatically, into the open position thereof. In a development of the invention, provision can be made for the actuating part, in the actuating position thereof, to be in contact in at least one region, and in particular in at least two spaced-apart regions, with the lid and, as a result, to load the lid into the open position. The actuating part preferably acts on the lid in the vicinity of or on the at least one strap hinge by which the lid is attached to the main part. A further region can preferably be provided on the diametrically opposite end of the lid in the vicinity of the finger support of the actuating part.

With regard to the method, the abovementioned object is achieved in a first refinement by a method for producing and installing a hinged closure lid of the design mentioned, by the following steps:

First of all, the main part, the lid and the actuating part are produced as a single-piece injection-molded plastics part, wherein the actuating part is arranged outside the main part and is connected to the lid via a flexible web. The main part is integrally formed via the at least one strap hinge on that end of the lid which is diametrically opposite the web, and therefore the actuating part, the lid and the main part are arranged in a row in this sequence.

Since the injection-molded plastics part has adequate stability, the lid with the actuating part attached is first of all pivoted relative to the main part about the strap hinge and/or the spring shackle in such a manner that the lid is located, in the closure position thereof, on the main part, with the actuating part being arranged adjacent to the main part. The actuating part is then pivoted about the web in such a manner that said actuating part enters from below into the interior of the cup- or hood-shaped main part and is arranged there, with the circumferential surface of the main part being reached through by the actuating part by way of a cut-out. The actuating part is preferably held within the main part in such a manner that said actuating part cannot drop out of the latter. This can be achieved, for example, by the actuating part being latched in the main part. The latching is configured here in such a manner that the actuating part is held displaceably in the main part.

A second refinement of the method has the following steps:

The hinged closure lid is produced as a single-piece injection-molded plastics part in the abovementioned manner. Since the injection-molded plastics part has adequate stability, the lid with the actuating part attached is first of all pivoted relative to the main part about the strap hinge and/or the spring shackle in such a manner that the lid is located, in the closure position thereof, on the main part, with the actuating part being arranged adjacent to the main part. The actuating part is the pivoted about the web in such a manner that said actuating part is arranged around the main part from below, i.e. the main part is arranged in the interior of the housing-shaped actuating part, with the circumferential surface of the actuating part being reached through by the main part by way of a cut-out. The actuating part of the main part are held here relative to each other, for example by means of latching, in such a manner that they do not become detached from each other, with the actuating part being held displaceably on the main part.

In order to have sufficient construction space for the pivoting movements of the lid and also of the actuating part, provision is preferably made for the main part and the actuating part to be connected at diametrically opposite sections of the lid to the latter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
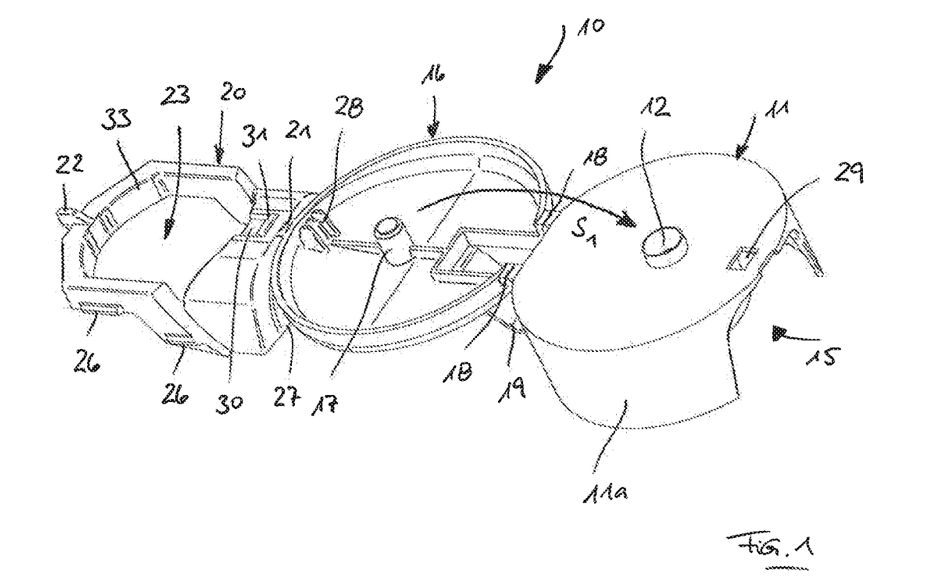
FIG. 1 is a perspective front view of a hinged closure lid according to a first exemplary embodiment before installation.
Figure 2:
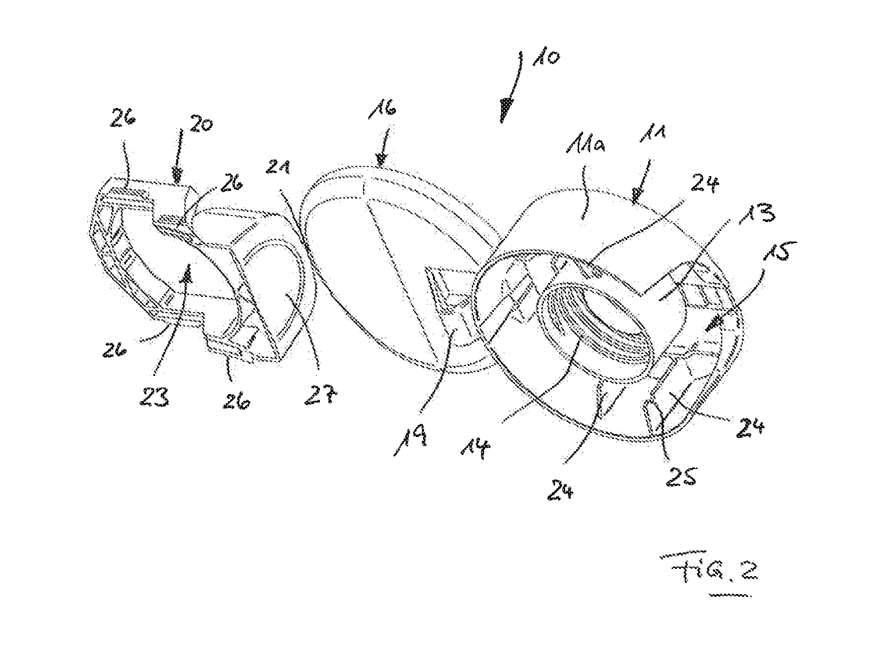
FIG. 2 is a perspective rear view of the hinged closure lid according to FIG. 1.

FIGS. 1 and 2 show a hinged closure lid 10 after the production thereof in the form of a single-piece injection-molded plastics part. The hinged closure lid 10 comprises a central lid 16, to which, in diametrically opposite regions, a main part 11 and an actuating part 20 are connected.

The main part 11 has a hood-shaped basic shape and has a dispenser opening 12 on the upper side thereof. Furthermore, the upper side has an aperture 29 in which an extension 28 of the lid 16 can engage. The upper side of the main part 11 has a smooth, untextured surface except for the dispenser opening 12 and the aperture 29, and therefore soiling or functional impairment of the hinged closure lid 10 by product residues is very substantially avoided.

Furthermore, the main part 11 has an encircling circumferential surface 11a which has a cut-out 15 on the side facing away from the lid 16.

Figure 5:
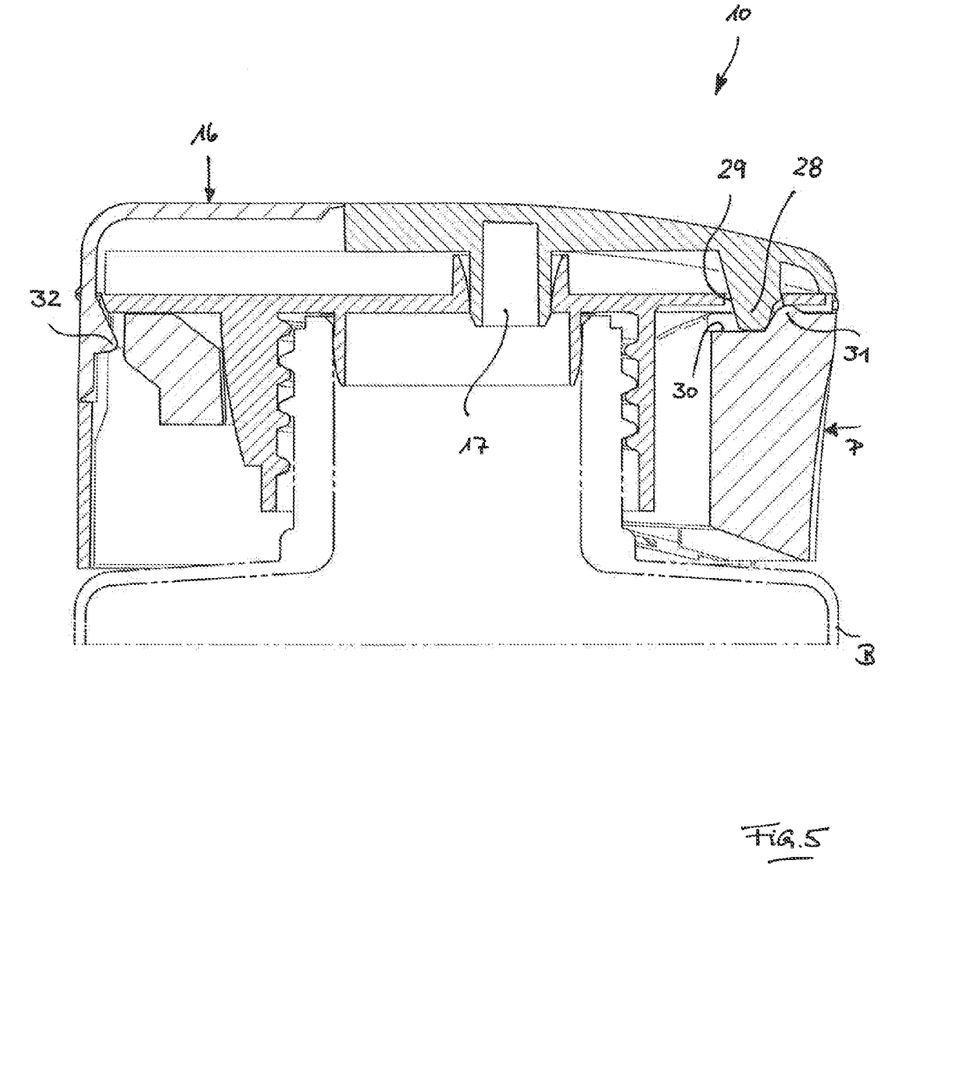
FIG. 5 is a vertical sectional view through the hinged closure lid according to FIG. 3.
Figure 6:
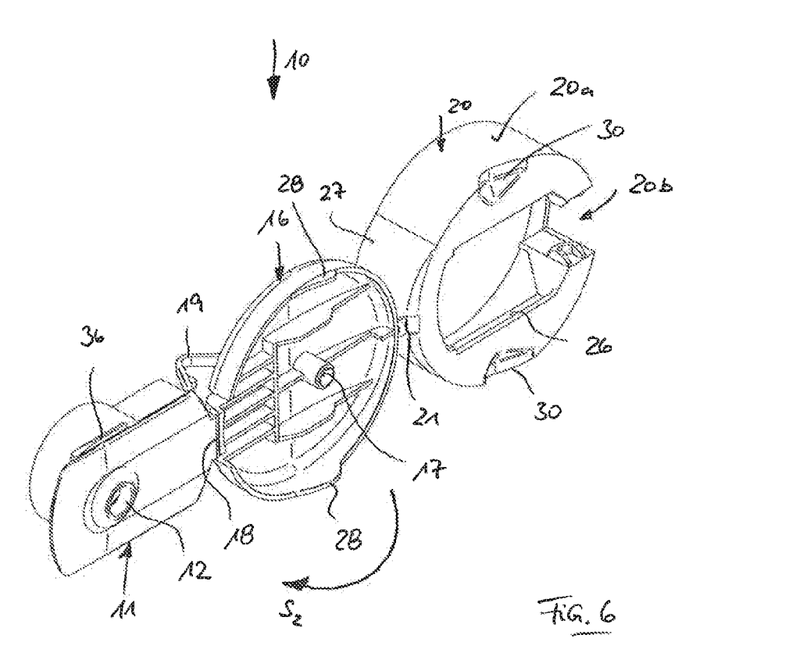
FIG. 6 is a perspective front view of a hinged closure lid according to a second exemplary embodiment before installation.
Figure 7:
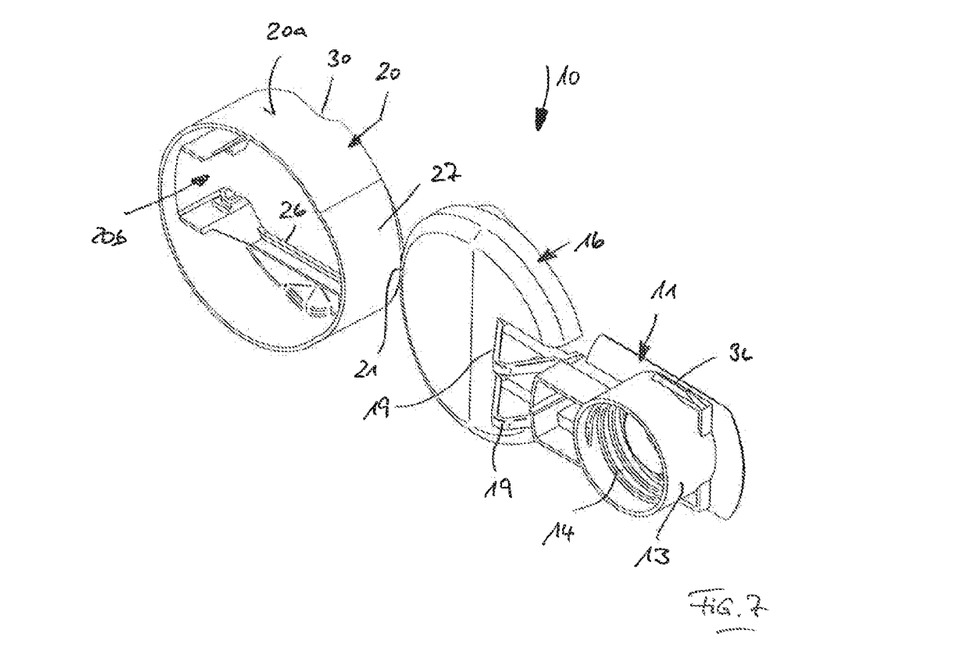
FIG. 7 is a perspective rear view of the hinged closure lid according to FIG. 6.
Figure 8:
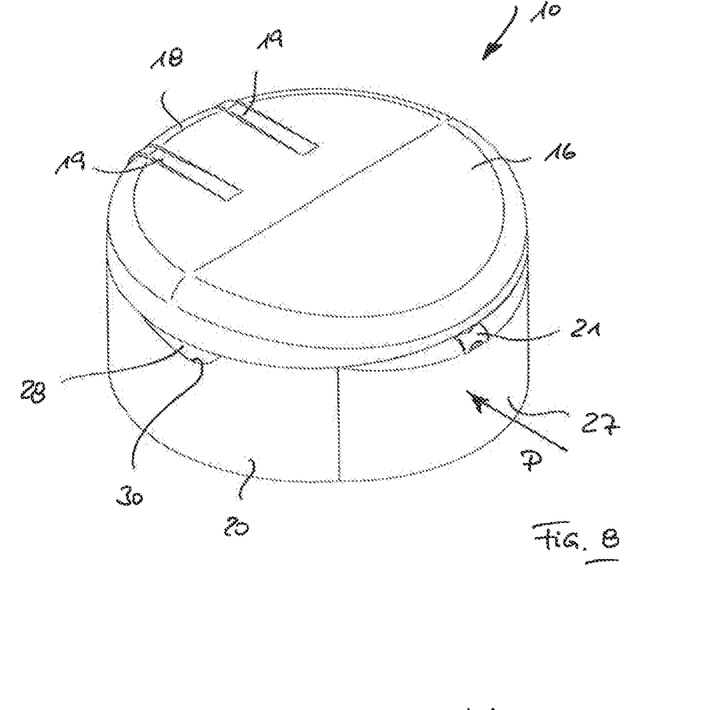
FIG. 8 is a perspective top view of the hinged closure lid after installation.
Figure 9:
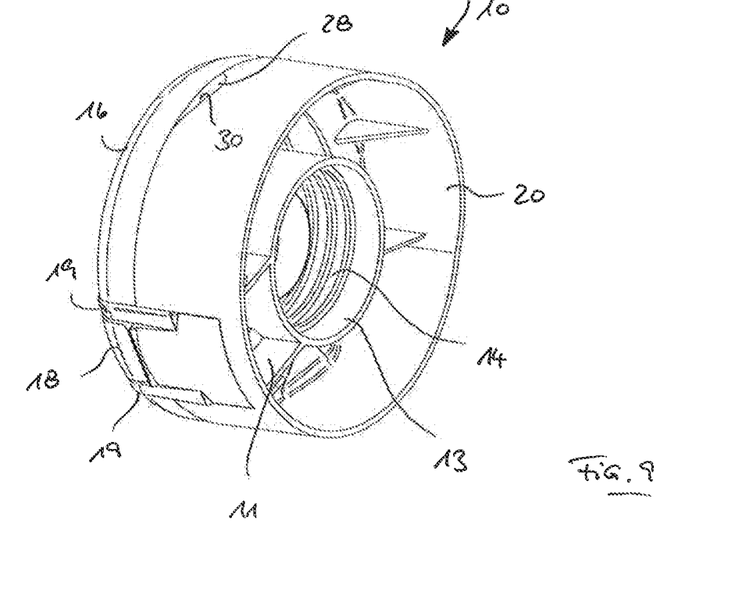
FIG. 9 is a perspective bottom view of the hinged closure lid according to FIG. 8.
Figure 10:
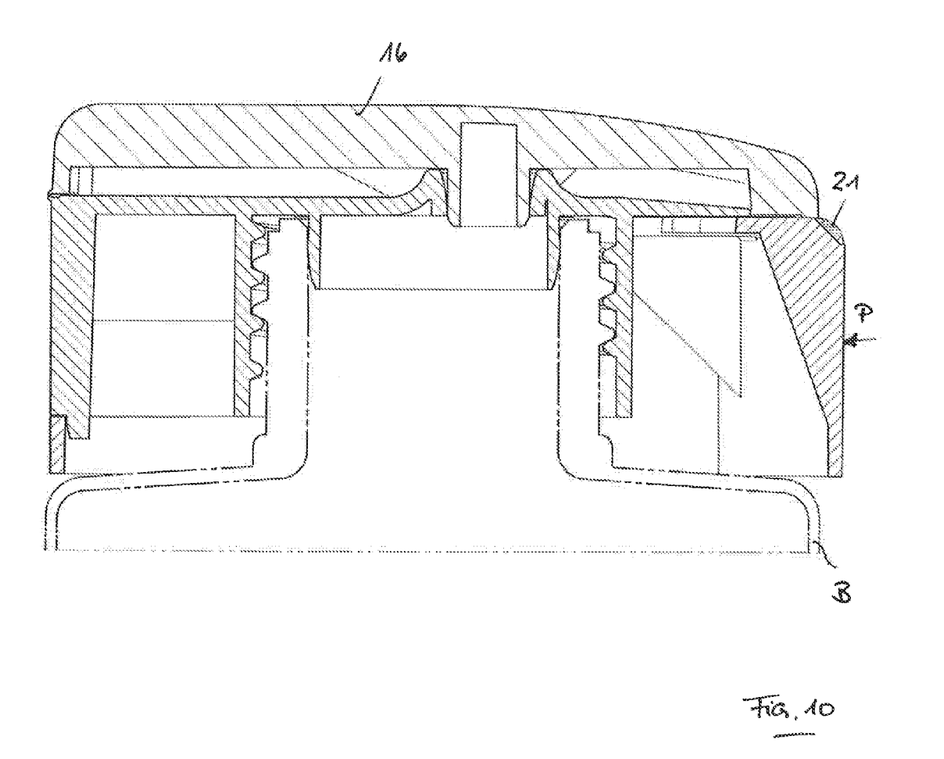
FIG. 10 is a vertical sectional view through the hinged closure lid according to FIG. 7.

A central, nozzle-shaped extension 13 is integrally formed inside the main part 11, the extension having an internal thread 14 with which the hinged closure lid 11 can be screwed onto a container B, which is illustrated merely by chain-dotted lines (see FIG. 5). Alternatively, it is also possible to latch or push the hinged closure lid 11 onto the container B.

A plurality of ribs 24 which protrude to the center of the main part 11 and each have a latching recess 25 are integrally formed on the inside of the circumferential surface 11a of the main part 11.

Figure 3:
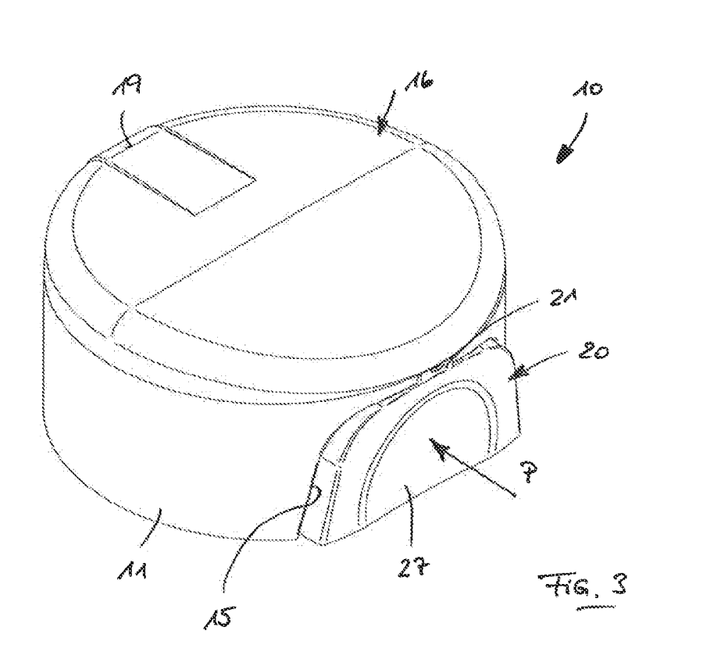
FIG. 3 is a perspective top view of the hinged closure lid after installation.
Figure 4:
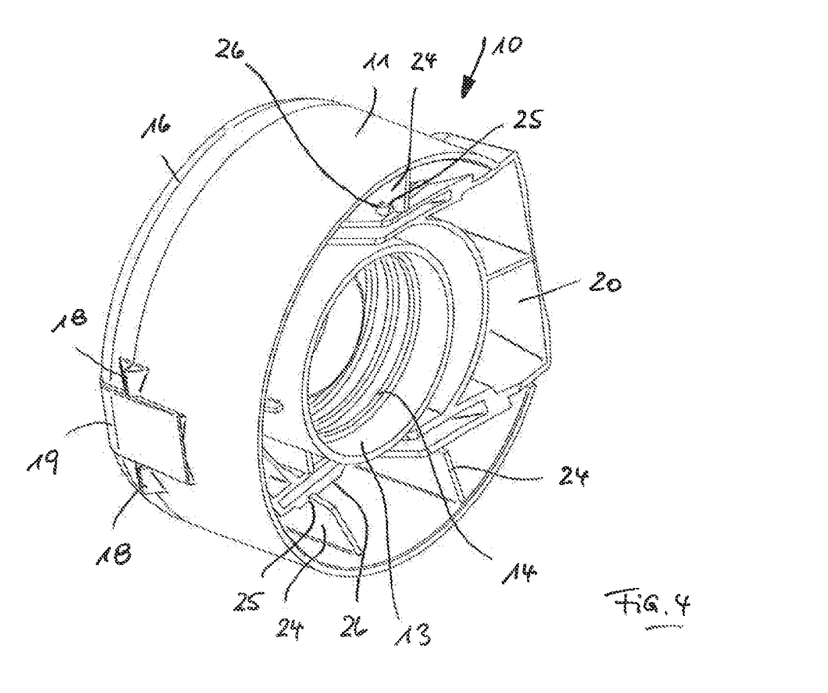
FIG. 4 is a perspective bottom view of the hinged closure lid according to FIG. 3.

In a circumferential region of the main part 11, the lid 16 is integrally connected via two strap hinges 18 which are spaced apart from each other in the circumferential direction of the main part 11. A likewise integrally formed, strap-shaped spring shackle 19 is provided between the strap hinges 18. If the lid 16 is pivoted out of the open position, which is illustrated in FIGS. 1 and 2 and in which the lid is arranged next to the main part 11, into the closure position, which is illustrated in FIGS. 3 to 5 and in which said lid is arranged on the main part 11, internal stresses build up in the spring shackle 19, the internal stresses loading the lid 16 into the open position thereof up to reaching a switching-over point and loading said lid into the closure position thereof after the switching-over point is exceeded.

The lid 16 is of substantially hood-shaped design and the lower side thereof, which faces the main part 11 in the closure position, has a stopper 17 which, in the closure position, engages in the dispenser opening 12 and closes the latter (see FIG. 5). Furthermore, the extension 28 is integrally formed on the lid in a manner offset from the stopper 17, the extension, in the closure position of the lid 16, reaching through the aperture 29 on the upper side of the main part 11 and protruding at the front end thereof into the interior of the main part 11.

The inner surface of the spring shackle 19, said surface facing the main part 11 in the closure position of the cover 16, has a projection 32 (see FIG. 5) which, in the closure position of the lid 16, protrudes by a small amount into the interior of the main part 11.

The actuating part 20 is integrally formed on that region of the lid 16 which is diametrically opposite the main part 11. The actuating part 20 is connected to the lid 16 solely via a web 21, which acts as a hinge joint and is connected to the edge of the lid 16. The actuating part 20 has a body which serves as a finger rest 27, is arranged in the vicinity of the lid 16 and the upper side of which has a depression 30 with an adjacent thrust bump 31.

At that end of the finger rest 27 which faces away from the lid 16, the actuating part 20 is in the form of a frame 33 which surrounds a central recess 23. A plurality of strip-shaped latching projections 26 are integrally formed on the outside of the frame 33, the outside facing away from the central recess 23.

At the end thereof facing away from the web 21, the actuating part 20 has a thrust plate 22 which protrudes in the direction facing away from the lid 16.

The production and installation of the hinged closure lid 10 will be described below. The hinged closure lid 10 is produced as a single-piece injection-molded plastics part in the manner illustrated in FIGS. 1 and 2, wherein the actuating part 20, the lid 16 and the main part 11 are arranged consecutively in this sequence as a single piece. In order to install the hinged closure lid 10, first of all the lid 16 is pivoted about the strap hinges 18 (see arrow $S_1$ in FIG. 1), and therefore the lid 16 comes to lie on the upper side of the main part 11. In this closure position (see FIG. 5), the stopper 17 is introduced into the dispenser opening 12 and closes the latter. The extension 28 reaches through the aperture 29 on the upper side of the main part 11.

The actuating part 20 is then pivoted about the web 21 in such a manner that said actuating part enters into the interior of the main part 11 from below through the cut-out 16 in the circumferential surface 11a of the main part 11. The frame 33 engages here around the nozzle-shaped extension 13 of the main part 11 and the latching projections 26 of the actuating part 20 enter into engagement with the latching recesses 25 of the ribs 24 of the main part 11. In this manner, the actuating part 20 can no longer drop out of the main part 11. The latching between the actuating part 20 and the main part 11 is selected in such a manner that it permits an adjustment or displacement of the actuating part 20 in the linear direction of the main part 11, but with the actuating part 20 first of all being obstructed by the web 21. In this fitted position, the depression 30 of the actuating part 20 is positioned below the aperture 29 of the main part 11 in which the extension 28 engages.

In this state, the thrust bump 31 of the actuating part 20 is located in the vicinity of the extension 28, and the thrust plate 22 of the actuating part 20 is located in the immediate vicinity of the projection 32 of the spring shackle 19, as illustrated in FIG. 5.

The hinged closure lid 10 can then be screwed or pushed onto a container after the latter has been filled with a product.

If a user wishes to open the hinged closure lid 10 placed onto a container, said user pushes from the outside against the finger rest 27 of the actuating part 20, said finger rest protruding laterally out of the main part 11, as a result of which a radially inwardly directed force P is exerted on said actuating part (see FIGS. 3 and 5). Owing to said force P, the web 21 via which the actuating part 20 is connected to the lid 16 tears. As a result, the actuating part 20 comes free from the lid 16 and can be displaced in the main part 11. A corresponding displacement of the actuating part 20 causes the thrust bump 31 to first of all come into contact with the extension 28 of the lid 16 and push the latter upward out of the aperture 29 of the main part 11. Immediately subsequently, the thrust plate 22 of the actuating part 20 comes into contact with the projection 32 of the spring shackle 19 and exerts a force thereon in the direction of the open position of the lid 16. The displacement of the actuating part 20 therefore brings about an initial pivoting of the lid 16 in the direction of the open position thereof, with the stopper 17 of the lid 16 being pulled out upwards from the dispenser opening 12 of the main part 11. As soon as the lid 16 has exceeded the switching-over point of the spring force of the spring shackle 19, said lid pivots into the open position thereof as a consequence of the internal force of the spring shackle 19.

Since the web 21 between the actuating part 20 and the lid 16 tears when the actuating part 20 is first actuated, said web also serves as a tamper-evident indicator, and therefore the user can always see whether the actuating part 20 has already been displaced once and therefore the lid 16 has already been opened.

FIGS. 6 to 10 illustrate a second embodiment of the hinged closure lid 10. Components which are identical or are initially functionally identical with the first embodiment are provided with the same reference numbers as in FIGS. 1 to 5, to the description of which reference is hereby made.

Also in the second embodiment, the hinged closure lid 10 is produced as a single-piece injection-molded plastics part and comprises the central lid 16, to which the main part 11 and the actuating part 20 are connected in diametrically opposite regions. In a modification of the first exemplary embodiment, the main part has a compact, box-shaped basic shape and bears rail-like latching projections 36 on the outside thereof.

The main part 11 is integrally connected via the strap hinge 18, which acts as a hinge joint, to one end of the lid 16. Two spring shackles 19 are integrally formed in the vicinity of the strap hinge 18, said spring shackles loading the lid 16 in the manner mentioned into the open position or the closure position depending on the pivoted position of said lid. The lid 16 can be introduced in the abovementioned manner by the stopper 17 thereof into the dispenser opening 12 of the main part. Furthermore, lateral extensions 28 which, in the closure position of the lid 16, protrude in the direction of the actuating part 20 and engage in depressions 30 formed there are integrally formed on the lid 16.

The actuating part 20 is integrally formed on that region of the lid 16 which is diametrically opposite the main part 11, said actuating part being connected to the main part 11 via the web 21, which acts as a hinge joint. In a modification of the first exemplary embodiment, the actuating part 20 is of housing-shape design with a circular-cylindrical basic shape, wherein a cut-out 20b is formed in the circumferential surface 20a of the actuating part 20.

A plurality of strip-shaped latching projections 26 are likewise integrally formed inside the actuating part 20, said latching projections being latchable to the rail-like latching projections 36 of the main part.

After the hinged closure lid 10 is produced as an injection-molded plastics part, the lid is brought into the closure position thereof on the main part 11 by being pivoted about the strap hinge 18 (see arrow $S_2$ in FIG. 6) and being placed onto the basic part 11, wherein the stopper 17 of said lid enters the dispenser opening 12 and closes the latter. The actuating part 20 is then pivoted about the web 21 for installation purposes in such a manner that the main part 11 enters the interior of the actuating part 20, and the inside of the housing-like actuating part 20 receives and surrounds the main part 11. The latching projections 26 enter into engagement here with the latching projections 36, and therefore an adjustment or displacement of the actuating part 20 relative to the main part 11 is possible, but said adjustment is prevented by the web 21 as long as the latter is not destroyed.

The hinged closure lid 10 can then be placed onto the container B after the latter has been filled with a product.

If the user applies a force P for the first time to the finger rest 27 (see FIGS. 8 and 10), the web 21 tears, and therefore the actuating part 20 comes free from the lid 16. During a further movement of the actuating part 20, and by contact of the extensions 28 of the lid 16 with the depressions 30 of the actuating part 20, the lid 16 is lifted off the actuating part 20 and, owing to the spring action of the spring shackles 19, pivots out of the closure position thereof into the open position thereof, wherein the stopper 17 of the lid 16 is pulled out of the dispenser opening 12 and releases the dispenser opening 12.

While specific embodiments of the invention have been shown and described in detail to illustrate the application of the principles of the invention, it will be understood that the invention may be embodied otherwise without departing from such principles.

The invention claimed is:

1. A hinged closure lid made of plastic for placing onto a container, the hinged closure lid comprising:
    a main part having a dispenser opening;
    a lid pivotably mounted on the main part and, in a closure position resting on the main part, said lid closing the dispenser opening; and
    an actuating part mounted on the main part so as to be adjustable between an inoperative position and an actuating position, wherein the lid is adjustable from the closure position in a direction of an open position when the actuating part is actuated, wherein the actuating part is connected to the lid only via at least one flexible web serving as a predetermined breaking point, wherein the web is destructible when the actuating part is first adjusted into the actuating position, said actuating part, in the actuating position thereof, being in contact with the lid and loading the lid into the open position, said actuating part being completely released from said lid and freely adjustable relative to said lid when said web is broken, wherein the actuating part is mounted displaceably on the main part.

2. A hinged closure lid according to claim 1, wherein the web forms a hinge joint.

3. A hinged closure lid according to claim 1, wherein the web is arranged on an outside of the lid.

4. A hinged closure lid according to claim 1, wherein the web is arranged adjacent to a finger rest of the actuating part.

5. A hinged closure lid according to claim 1, wherein the actuating part is mounted in a form-fitting manner on the main part.

6. A hinged closure lid according to claim 5, wherein the actuating part is latched to the main part.

7. A hinged closure lid according to claim 1, wherein the lid is integrally connected to the main part.

8. A hinged closure lid according to claim 1, wherein the lid is connected to the main part via at least one strap hinge.

9. A hinged closure lid according to claim 1, wherein the lid is connected to the main part via at least one spring shackle.

10. A hinged closure lid according to claim 9, wherein the spring shackle loads the lid one or more of into the open position thereof and into the closure position thereof.

11. A hinged closure lid according to claim 1, wherein the lid has at least one extension which reaches through the main part by way of an aperture in the closure position of the lid.

12. A hinged closure lid according to claim 1, wherein the main part and the actuating part are connected at diametrically opposite sections to the lid.

13. A hinged closure lid according to claim 1, wherein the main part is of hood-shape design and, in a circumferential surface thereof, said main part has a cut-out, in which the actuating part together with the finger rest thereof is arranged.

14. A hinged closure lid according to claim 1, wherein the actuating part is of housing-shape design, and the main part is arranged in the actuating part.

15. A method for producing and installing a hinged closure lid, the method comprising:
    producing a main part, a lid and an actuating part as a single-piece injection-molded plastics part, wherein the actuating part is arranged outside the main part and the actuating part is connected to the lid via a flexible web, wherein the lid is brought into a closure position arranged on the main part and the actuating part is pivoted about the web after the lid is in the closure position in such a manner that said actuating part is arranged in an interior of the main part and reaches through a circumferential surface of the main part by way of a cut-out.

16. A method according to claim 15, wherein the actuating part is latched to the main part in such a manner that said actuating part is held displaceably thereon.

17. A method according to claim 15, wherein the main part and the actuating part are connected at diametrically opposite sections to the lid.

18. A method according to claim 15, wherein the actuating part is connected to the lid via only said flexible web when the actuating part is arranged outside the main part, said flexible web being in direct contact with said lid and said actuating part when the actuating part is arranged outside the main part and when the actuating part is arranged in said interior of the main part, wherein said actuating part is completely separated from said lid and freely adjustable relative to said lid when said web is broken.

19. A method for producing and installing a hinged closure lid, the method comprising:
    producing a main part, a lid and an actuating part as a single-piece injection-molded plastics part, wherein the actuating part is arranged outside the main part and the actuating part is connected to the lid via a flexible web, wherein the lid is brought into a closure position arranged on the main part and the actuating part is subsequently pivoted about the web in such a manner that an inside of said actuating part receives the main part, wherein the main part reaches through a circumferential surface of the actuating part by way of a cut-out.

* * * * *